US012432484B2

(12) United States Patent
Li

(10) Patent No.: US 12,432,484 B2
(45) Date of Patent: Sep. 30, 2025

(54) ANTI-WIND NOISE EARPHONE DEVICE

(71) Applicant: Shenzhen Dancing Future Technology Ltd., Shenzhen (CN)

(72) Inventor: Haoqian Li, Guangdong (CN)

(73) Assignee: SHENZHEN DANCING FUTURE TECHNOLOGY LTD., Shenzhen (CN)

( * ) Notice: Subject to any disclaimer, the term of this patent is extended or adjusted under 35 U.S.C. 154(b) by 199 days.

(21) Appl. No.: 18/020,087

(22) PCT Filed: Aug. 27, 2020

(86) PCT No.: PCT/CN2020/111598
§ 371 (c)(1),
(2) Date: Feb. 7, 2023

(87) PCT Pub. No.: WO2022/036735
PCT Pub. Date: Feb. 24, 2022

(65) Prior Publication Data
US 2023/0336907 A1 Oct. 19, 2023

(30) Foreign Application Priority Data
Aug. 19, 2020 (CN) ......................... 202010839441.6

(51) Int. Cl.
*H04R 1/10* (2006.01)
*G10K 11/178* (2006.01)

(52) U.S. Cl.
CPC ..... *H04R 1/1083* (2013.01); *G10K 11/17881* (2018.01); *H04R 1/1016* (2013.01);
(Continued)

(58) Field of Classification Search
CPC ................ H04R 1/1083; H04R 1/1016; H04R 2410/07; H04R 2460/01; G10K 11/17881; G10K 2210/1081
See application file for complete search history.

(56) References Cited

U.S. PATENT DOCUMENTS

2007/0053538 A1 3/2007 Jensen
2014/0072141 A1* 3/2014 Cohen ...................... H04R 1/04 381/91
(Continued)

FOREIGN PATENT DOCUMENTS

CN 101742371 A 6/2010
CN 205754738 U 11/2016
(Continued)

OTHER PUBLICATIONS

International Search Report and Written Opinion in PCT/CN2020/111598, mailed May 19, 2021, 11 pages.
(Continued)

*Primary Examiner* — David L Ton
(74) *Attorney, Agent, or Firm* — Astute IP Law Group

(57) ABSTRACT

The present application discloses an anti-wind noise earphone device. The anti-wind noise earphone device includes a shell, a first pickup hole and a second pickup hole, the first pickup hole and the second pickup hole being provided in the same side of the shell, the first pickup hole communicating with the second pickup hole via a channel, the channel communicating with a microphone. According to the present application, the first pickup hole and the second pickup hole communicate with each other via the channel, so as to channel and eliminate wind noise energy and achieve the purpose of eliminating wind noise, the structure is simple, and the effect of eliminating wind noise is obvious.

12 Claims, 6 Drawing Sheets

(52) U.S. Cl.
CPC .. *G10K 2210/1081* (2013.01); *H04R 2410/07* (2013.01); *H04R 2460/01* (2013.01)

(56) References Cited

U.S. PATENT DOCUMENTS

| | | | | |
|---|---|---|---|---|
| 2014/0193024 | A1 | 7/2014 | Raff | |
| 2015/0221322 | A1 | 8/2015 | Iyengar et al. | |
| 2021/0014598 | A1* | 1/2021 | Pine | H04R 1/1041 |

FOREIGN PATENT DOCUMENTS

| | | | |
|---|---|---|---|
| CN | 206611552 | U | 11/2017 |
| CN | 207531016 | U | 6/2018 |
| CN | 109168105 | A | 1/2019 |
| CN | 208386852 | U | 1/2019 |
| CN | 210743637 | U | 6/2020 |
| CN | 210867806 | U | 6/2020 |
| CN | 212305634 | U | 1/2021 |
| EP | 3493556 | A1 | 6/2019 |
| JP | H0366985 | U | 6/1991 |
| JP | 2017028718 | A | 2/2017 |
| WO | 2017206487 | A1 | 12/2017 |

OTHER PUBLICATIONS

Notice of Allowance in Chinese Patent Application No. 202021759529.9, mailed Dec. 11, 2020, 2 pages.

Office Action in Japanese Patent Application No. 2023-509661, mailed Mar. 22, 2024, 6 pages.

Office Action for Chinese Patent Application No. 202010839441.6, mailed on Sep. 27, 2024, 11 pages.

Notification to Grant Patent Right for Invention for Chinese Patent Application No. 202010839441.6, mailed on Jan. 23, 2025, 5 pages.

* cited by examiner

ANTI-WIND NOISE EARPHONE DEVICE

CROSS REFERENCE TO RELATED APPLICATIONS

The present application is based on and claims the priority of the Chinese Patent Application No. 202010839441.6 filed on Aug. 19, 2020, the entire contents of which are incorporated herein by reference.

FIELD OF TECHNOLOGY

The present application relates to the technical field of electronic apparatuses, in particular to an anti-wind noise earphone device.

BACKGROUND

In the prior art, many headsets have various drawbacks in design, some may realize signal transmission but may not prevent wind noise, or may prevent wind noise but may not realize signal transmission. Many earphones are not reasonable in design and poor in anti-wind noise effect, resulting in poor audio experience for users.

SUMMARY

The present application provides an anti-wind noise earphone device in order to overcome the defects in the prior art.

In order to achieve the above objective, the present application adopts the following technical solution:

An anti-wind noise earphone device includes a shell, a first pickup hole, and a second pickup hole, the first pickup hole and the second pickup hole being provided in a same side of the shell, the first pickup hole communicating with the second pickup hole via a channel, the channel communicating with a microphone.

The further technical solution thereof is: an acoustic mesh is disposed between the microphone and the channel.

The further technical solution thereof is: the microphone is fixed on a circuit board, and the circuit board is fixed in the shell.

The further technical solution thereof is: the microphone is wrapped with a silicone case; the silicone case communicates with the channel via a through hole; the acoustic mesh is disposed between the through hole and the channel; and the silicone case is in sealed connection with the circuit board.

The further technical solution thereof is: the shell is provided with a first mounting position and a second mounting position; a first mounting piece is disposed at the first mounting position, and a second mounting piece is disposed at the second mounting position; the first mounting piece is provided with a first pore channel to form the first pickup hole; and the second mounting piece is provided with a second pore channel to form the second pickup hole.

The further technical solution thereof is: a connecting piece is disposed on an inner side of the shell; and the connecting piece is disposed next to the first mounting piece and the second mounting piece, such that the channel is formed between the connecting piece and the first mounting piece and the second mounting piece.

The further technical solution thereof is: the first mounting piece and the second mounting piece are metal pieces, and are electrically connected to the circuit board, such that the first mounting piece and the second mounting piece serve as a positive electrode and a negative electrode.

The further technical solution thereof is: cross-sectional areas of the first pickup hole and the second pickup hole are each greater than 0.6 $mm^2$.

The further technical solution thereof is: the volume of the channel is smaller than 12 $mm^3$.

The further technical solution thereof is: the acoustic mesh is made of damping material.

Compared with the prior art, the present application has the following beneficial effects: the first pickup hole and the second pickup hole of the present application communicate with each other via the channel, so as to channel and eliminate wind noise energy and achieve the purpose of eliminating wind noise, the structure is simple, and the effect of eliminating wind noise is obvious.

The above description is merely an overview of the technical solutions of the present application, which may be implemented according to the contents of the specification for a clearer understanding of the technical means of the present application. In addition, in order to make the above and other objectives, features and advantages of the present application more clearly understood, preferred embodiments are set forth below in detail.

DESCRIPTION OF THE EMBODIMENTS

Figure 1:
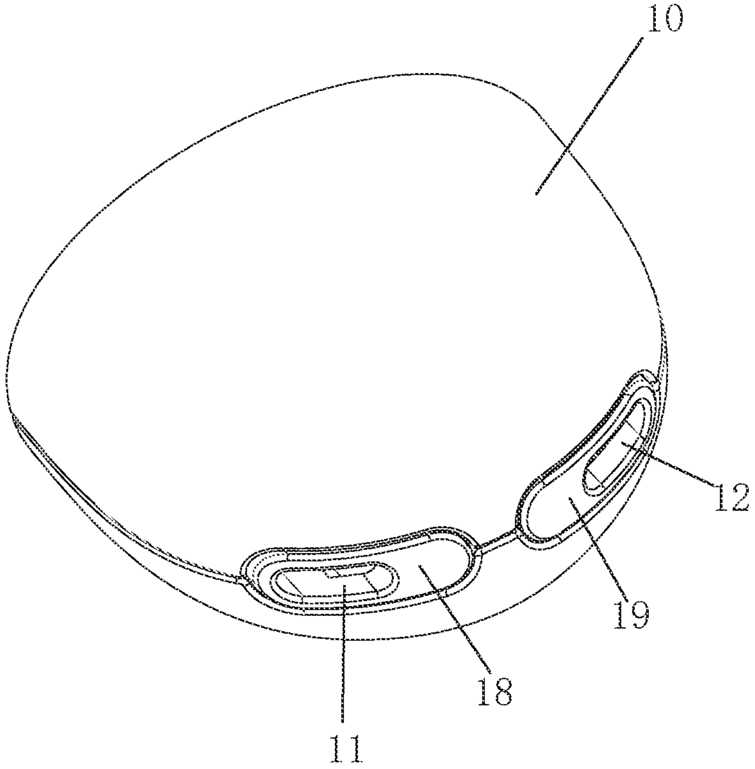
FIG. 1 is a three-dimensional diagram of an anti-wind noise earphone device according to the present application.

For clearer descriptions of the objectives, technical solutions, and advantages of the present application, the present application will be described hereinafter in further detail with reference to the accompanying drawings and the detailed description.

The technical solutions according to the embodiments of the present application will be clearly and completely described below with reference to the accompanying drawings according to the embodiments of the present application. Apparently, the described embodiments are merely a part of the embodiments of the present application, rather than all the embodiments. Based on the embodiments of the present application, all other embodiments obtained by a person skilled in the art without inventive efforts fall within the scope of the present application.

In the description of the present application, it is to be understood that the terms "center", "longitudinal", "transverse", "length", "width", "thickness", "upper", "lower", "front", "rear", "left", "right", "vertical", "horizontal", "top", "bottom", "inner", "outer", "clockwise", "anticlockwise", and the like indicate orientations or positional relationships based on the orientations or positional relationships shown in the accompanying drawings, merely to facilitate the description of the present application and simplify the description, are not intended to indicate or imply that the referenced devices or elements must have a particular orientation or be constructed and operated in a particular orientation, and therefore should not be construed as limiting the present application.

Furthermore, the terms "first" and "second" are provided for descriptive purposes merely and are not to be construed as indicating or implying relative importance or implicitly indicating the number of technical features indicated. Thus, a feature defined as "first" or "second" may explicitly or implicitly include one or more of the feature. In the description of the present application, "a plurality of" refers to two or more, unless expressly and specifically limited otherwise.

In the present application, unless expressly stated or limited otherwise, the terms "mounted", "connected", "connecting", "fixed", and the like are to be interpreted broadly. For example, it may be a fixed connection, a detachable connection, or an integral connection; or it may be a mechanical connection or an electrical connection; or it may be a direct connection, or an indirect connection through an intermediate medium, or communication between two elements or the interaction relationship between two elements. The specific meanings of the above terms in the present application may be understood by a person of ordinary skill in the art according to specific circumstances.

In the present application, unless expressly stated or limited otherwise, a first feature being "above" or "below" a second feature may include that the first feature and the second feature are in direct contact, or that the first feature and the second feature are not in direct contact but are in contact via another feature therebetween. Furthermore, a first feature being "above", "over" and "on" a second feature includes that the first feature is over and above the second feature, or merely indicates that the first feature is horizontally higher than the second feature. The first feature being "below", "under" and "beneath" the second feature includes the first feature being under and below the second feature, or merely indicates that the first feature is horizontally lower than the second feature.

In the description of this specification, reference to the description of the terms "one embodiment", "some embodiments", "example", "specific example", or "some examples", etc. means that the specific features, structures, materials, or characteristics described in connection with the embodiment or example is included in at least one embodiment or example of the present application. In this specification, schematic representations of the above terms should not be construed as necessarily referring to the same embodiment or example. Furthermore, the specific features, structures, materials, or characteristics described may be combined in any suitable manner according to any one or more embodiments or examples. In addition, the different embodiments or examples described in this specification may be combined and integrated by a person skilled in the art.

Figure 2:
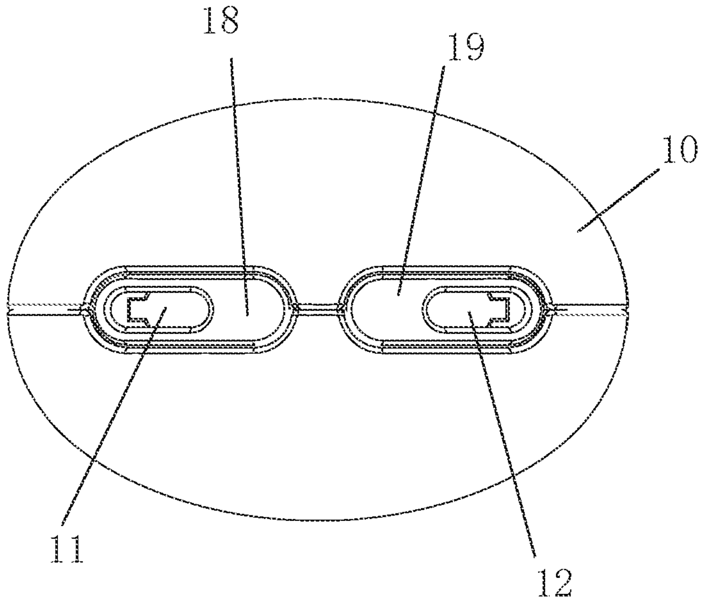
FIG. 2 is a front view of an anti-wind noise earphone device according to the present application.
Figure 3:
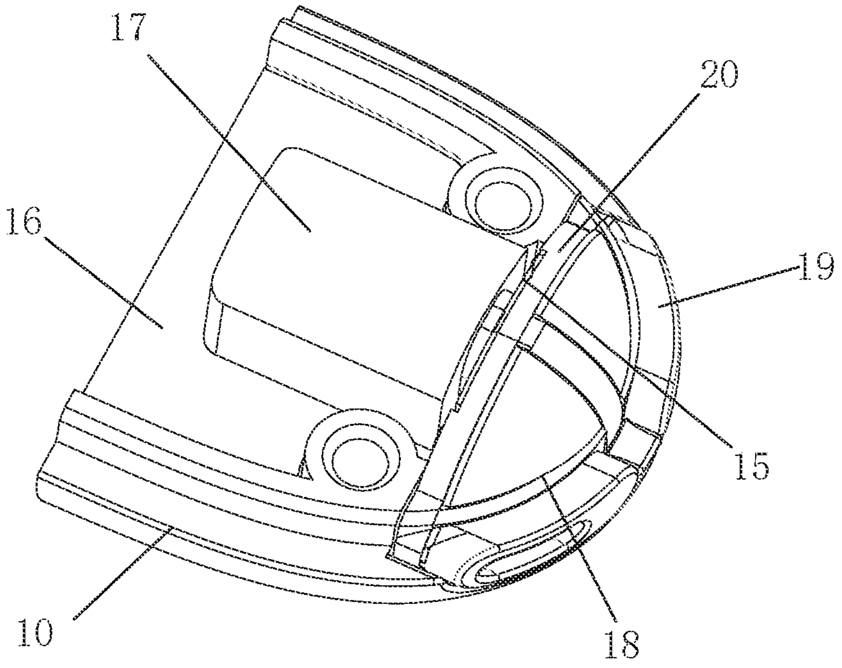
FIG. 3 is a diagram of an internal structure of an anti-wind noise earphone device according to the present application.
Figure 4:
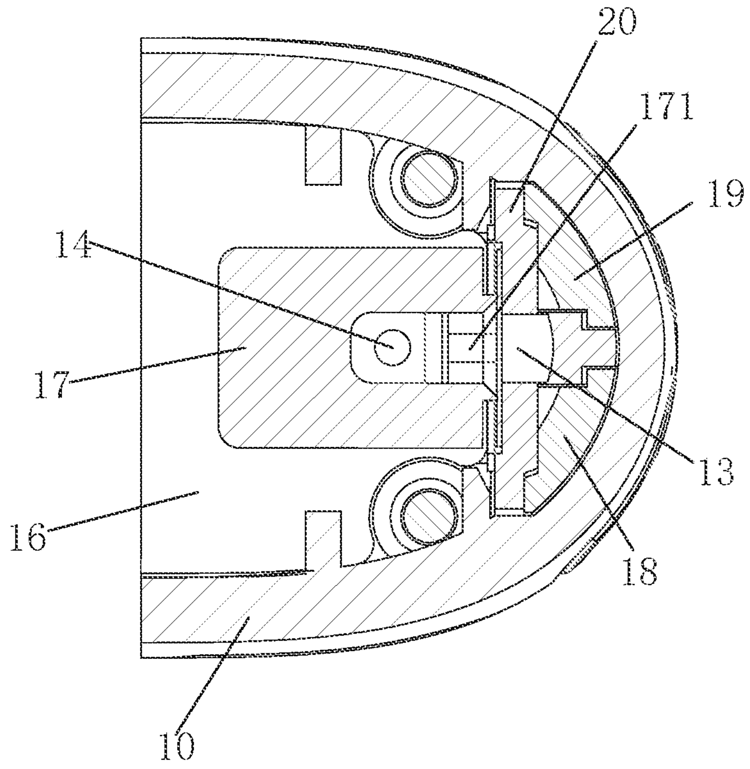
FIG. 4 is a transverse section view of an anti-wind noise earphone device according to the present application.
Figure 5:
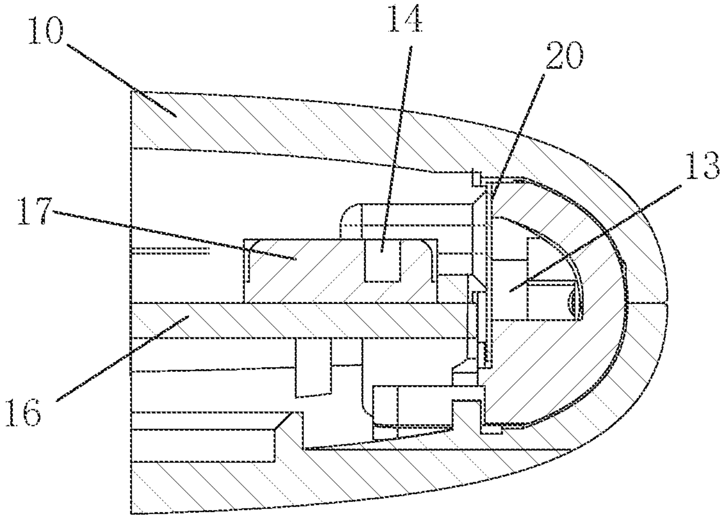
FIG. 5 is a vertical section view of an anti-wind noise earphone device according to the present application.
Figure 6:
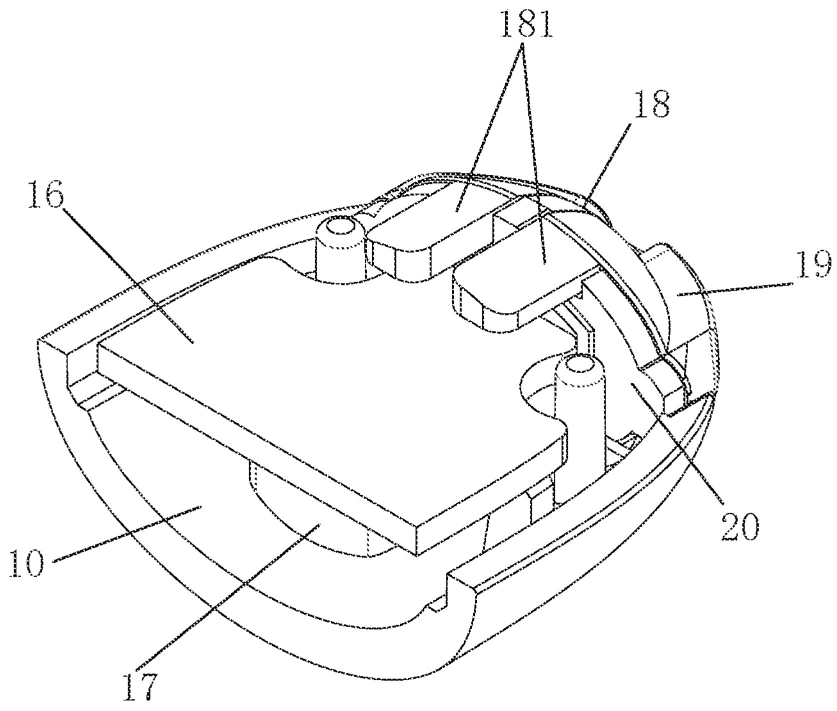
FIG. 6 is a structural diagram of an anti-wind noise earphone device according to the present application.

FIG. 1 to FIG. 6 are accompanying diagrams of the present application.

This embodiment provides an anti-wind noise earphone device. Referring to FIG. 1 to FIG. 6, the anti-wind noise earphone device includes a shell 10, a first pickup hole 11, and a second pickup hole 12, and the first pickup hole and the second pickup hole are provided in the same side of the shell 10. The first pickup hole 11 communicates with the second pickup hole 12 via a channel 13, and the channel 13 communicates with a microphone 14. The first pickup hole 11 and the second pickup hole 12 are provided in the axial direction of the device, and the channel 13 is provided in the transverse direction of the device, such that the first pickup hole 11 and the second pickup hole 12 communicate with each other. The side, with the first pickup hole 11 and the second pickup hole 12, of the shell 10 is designed into an arc shape. The directions of the first pickup hole 11 and the second pickup hole 12 intersect with the arc-shaped shell 10, and the first pickup hole 11 and the second pickup hole 12 are spaced by a certain distance, and may be understood as being symmetrical. In this way, when wind enters from the first pickup hole 11 and the second pickup hole 12, the wind meets via the channel 13. Due to sound interference of the first pickup hole 11 and the second pickup hole 12 at the channel 13, resonant noise elimination is achieved, and thus high-frequency sound in wind noise is filtered away.

Specifically, as the first pickup hole 11 and the second pickup hole 12 communicate with each other via the channel 13, wind entering from the first pickup hole 11 may flow into the second pickup hole 12 via the channel 13, and wind entering from the second pickup hole 12 may also flow into the first pickup hole 11 via the channel 13. In this way, the wind energy may be weakened by means of the communicating first pickup hole 11 and second pickup hole 12, and accordingly the energy of wind entering a through hole 171. Further, an acoustic mesh 15 is disposed between the through hole 171 and the channel 13, and the acoustic mesh 15 may further weaken or eliminate the wind energy. Finally, the wind energy reaching a microphone 14 is very small, achieving the effect of eliminating wind noise.

Preferably, the acoustic mesh 15 is disposed between the microphone 14 and the channel 13. The acoustic mesh 15 is made of damping material and may further effectively weaken the wind energy.

The microphone 14 is fixed on a circuit board 16, and the circuit board 16 is fixed in the shell 10. The microphone 14 is fixed on the circuit board 16 as a patch, and is disposed close to the channel 13.

The microphone 14 is wrapped with a silicone case 17. The silicone case 17 communicates with the channel 13 via the through hole 171. The acoustic mesh 15 is disposed between the through hole 171 and the channel 13. The silicone case 17 is in sealed connection with the circuit board 16 to prevent the microphone 14 from outside sound interference.

Specifically, the shell 10 is provided with a first mounting position and a second mounting position. A first mounting piece 18 is disposed at the first mounting position, and a second mounting piece 19 is disposed at the second mounting position. The first mounting piece 18 is provided with a first pore channel to form the first pickup hole 11. The second mounting piece 19 is provided with a second pore channel to form the second pickup hole 12.

A connecting piece 20 is disposed on an inner side of the shell 10. The connecting piece 20 is disposed next to the first mounting piece 18 and the second mounting piece 19, such that the channel 13 is formed between the connecting piece 20 and the first mounting piece 18 and the second mounting piece 19. Preferably, the connecting piece 20 is a plastic piece, such that the first mounting piece 18 and the second mounting piece 19 may be isolated from each other to avoid short circuit.

The first mounting piece 18 and the second mounting piece 19 are metal pieces, and are electrically connected to the circuit board 16, such that the first mounting piece 18 and the second mounting piece 19 serve as a positive electrode and a negative electrode to achieve charging for the device and data interaction, mainly for DC charging and AC signal communication.

The first mounting piece 18 and the second mounting piece 19 are each provided with an extension part 181, and the extension parts are electrically connected to the circuit board.

Preferably, cross-sectional areas of the first pickup hole 11 and the second pickup hole 12 are each greater than 0.6 $mm^2$. The first pickup hole 11 and the second pickup hole 12 may be round, oval, racetrack-shaped, rectangular, or other shapes.

Preferably, the volume of the channel 13 is smaller than 12 $mm^3$.

Preferably, the acoustic mesh 15 is made of damping material.

Preferably, the channel 13 is of a cavity structure.

The rechargeable anti-wind noise earphone device has a better call effect, achieves active noise cancellation, and also achieves AC and DC signal transmission with external devices.

Compared with the prior art, the present application has the advantages that the first pickup hole 11 and the second pickup hole 12 communicate with each other via the channel 13, so as to channel and eliminate wind noise energy and achieve the purpose of eliminating wind noise, the structure is simple, and the effect of eliminating wind noise is obvious. At the same time, the structure has the functions of DC charging and AC signal communication, and has various functions.

The foregoing is provided by way of example only to further illustrate the present application so that it may be more readily understood by a reader. However, it is not intended that the embodiments of the present application be so limited, and that any technical extensions or innovations made in accordance with the present application be protected thereby. It is intended that the scope of the present application be defined by the claims appended hereto.

What is claimed is:

1. An anti-wind noise earphone device, comprising a shell, a first pickup hole and a second pickup hole, the first pickup hole and the second pickup hole being provided in a same side of the shell, the first pickup hole communicating with the second pickup hole via a channel, the channel communicating with a microphone;

wherein the shell is provided with a first mounting position and a second mounting position; a first mounting piece is disposed at the first mounting position, and a second mounting piece is disposed at the second mounting position; the first mounting piece is provided with a first pore channel to form the first pickup hole; and the second mounting piece is provided with a second pore channel to form the second pickup hole.

2. The anti-wind noise earphone device according to claim 1, wherein an acoustic mesh is disposed between the microphone and the channel.

3. The anti-wind noise earphone device according to claim 2, wherein the microphone is fixed on a circuit board, and the circuit board is fixed in the shell.

4. The anti-wind noise earphone device according to claim 3, wherein the microphone is wrapped with a silicone case; the silicone case communicates with the channel via a through hole; the acoustic mesh is disposed between the through hole and the channel; and the silicone case is in sealed connection with the circuit board.

5. The anti-wind noise earphone device according to claim 2, wherein the acoustic mesh is made of damping material.

6. The anti-wind noise earphone device according to claim 1, wherein a connecting piece is disposed on an inner side of the shell; and the connecting piece is disposed next to the first mounting piece and the second mounting piece, such that the channel is formed between the connecting piece and the first mounting piece and the second mounting piece.

7. The anti-wind noise earphone device according to claim 6, wherein the first mounting piece and the second mounting piece are metal pieces, and are electrically connected to the circuit board, such that the first mounting piece and the second mounting piece serve as a positive electrode and a negative electrode.

8. The anti-wind noise earphone device according to claim 6, wherein the connecting piece is a plastic piece.

9. The anti-wind noise earphone device according to claim 1, wherein cross-sectional areas of the first pickup hole and the second pickup hole are each greater than 0.6 $mm^2$.

10. The anti-wind noise earphone device according to claim 1, wherein a volume of the channel is smaller than 12 $mm^3$.

11. The anti-wind noise earphone device according to claim 1, wherein a side, with the first pickup hole and the second pickup hole, of the shell is in an arc shape, and directions of the first pickup hole and the second pickup hole intersect with the shell.

12. The anti-wind noise earphone device according to claim 1, wherein the first pickup hole and the second pickup hole are spaced by a certain distance and are symmetrically arranged.

* * * * *